United States Patent Office 3,647,749
Patented Mar. 7, 1972

3,647,749
ANTIOXIDANT COMPOSITION FOR
ORGANIC MATERIALS
Edward F. Zaweski, Pleasant Ridge, and Bernard R.
Meltsner, Royal Oak, Mich., assignors to Ethyl Corporation, New York, N.Y.
No Drawing. Original application July 28, 1966, Ser. No.
568,390, now Patent No. 3,491,137, dated Jan. 20,
1970. Divided and this application Sept. 26, 1969, Ser.
No. 861,458
Int. Cl. C08d 11/04; C08f 45/60; C08g 51/60
U.S. Cl. 260—45.85                12 Claims

ABSTRACT OF THE DISCLOSURE

Organic material such as polypropylene is stabilized by addition of dihydrocarbyl-hydroxyphenoxy hydrocarbyl silanes having the formula:

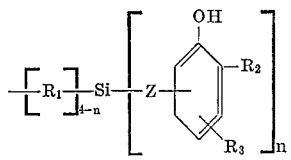

wherein $R_1$ and $R_2$ are hydrocarbon radicals, Z is oxygen, sulfur or the imino group, and $R_3$ is a hydrocarbon radical, an alkoxy radical or a halogen. A typical example is diphenyl bis(3,5 - di-tert-butyl-4-hydroxyphenoxy)silane. Effectiveness is improved by including a dihydrocarbyl-thiodialkanoate such as dilaurylthiodipropionate, or a phosphonate such as tri-p-nonylphenylphosphite.

---

This application is a division of application Ser. No. 568,390, filed July 28, 1966, now U.S. 3,491,137.

This invention relates to new silicon compounds and their use as antioxidants.

Most organic materials undergo degradation in the presence of oxygen. This degradation is accelerated at elevated temperatures. Frequently, high temperatures are encountered during the processing of these materials in manufacturing operations and thus some form of stabilizer is required many materials during the manufacturing stage. Other materials are not subject to extremes of temperature during manufacture, but even these undergo degradation on aging.

An object of this invention is to provide an additive capable of preventing degradation of organic materials due to oxygen. A further object is to provide organic materials of increased stability against the effects of elevated temperatures during manufacture and which are also stable during long periods of aging under normal conditions. A particular object is to provide polyolefins, for example, polypropylenes, of exceptionally high temperature stability and capable of resisting degradation due to oxygen during long periods of use. Other objects will become apparent from the following description of the invention.

These and other objects are accomplished by providing antioxidant compounds having the formula:

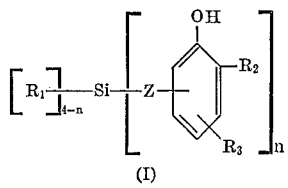
(I)

wherein $n$ is an integer from 1–4, $R_1$ is a hydrocarbon radical containing from 1 to about 20 carbon atoms, Z is selected from the group consisting of oxygen, sulfur and the imino radical, $R_2$ is selected from the group consisting of alpha-branched alkyl radicals containing from 3–20 carbon atoms, alpha-branched aralkyl radicals containing from 8–20 carbon atoms, aryl radicals containing from 6–20 carbon atoms, and cycloalkyl radicals containing from 6–20 carbon atoms, and $R_3$ is selected from the group consisting of hydrogen, alkyl radicals containing from 1–20 carbon atoms, aryl radicals containing from 6–20 carbon atoms, aralkyl radicals containing from 7–20 carbon atoms, cycloalkyl radicals containing from 6–20 carbon atoms, halogen and alkoxy radicals containing from 1–12 carbon atoms.

Some representative examples of these compounds are:

diethyl bis(3,5-di-tert-butyl-2-hydroxyphenoxy)silane,
dicyclohexyl-di[3-(α-methylbenzyl)-5-methyl-2-hydroxyphenoxy]silane,
tribenzyl(2-ethyl-5-tert-butyl-4-hydroxyphenoxy)silane,
phenyl tri(3-methyl-5-tert-octyl-4-hydroxyphenoxy)silane,
diphenyl di[3-methyl-5-(α,α-dimethylbenzyl)-4-hydroxythiophenoxy]silane,
dieicosyl di(3-tert-butyl-2-hydroxythiophenoxy)silane,
2,4,6-tri-tert-butylphenyl-tris(3-tert-butyl-5-methyl-4-hydroxyanilino)silane,
di(3,5-di-tert-butyl-cyclohexyl)-di-(2-hydroxy-3-cyclohexyl-5-tert-butylanilino)silane,
dimethyl di(-3-cyclohexyl-4-hydroxy-6-methylphenoxy) silane,
tri-dodecyl(3-isopropyl-4-hydroxyphenoxy)silane, and
di-α-naphthyl[2-methyl-4-hydroxy-5-(α,α-dimethylbenzyl)thiophenoxy]silane.

In a preferred embodiment of the invention the Z in Formula I is oxygen and is bonded to the position para to the phenolic hydroxyl radical. This preferred embodiment has the formula:

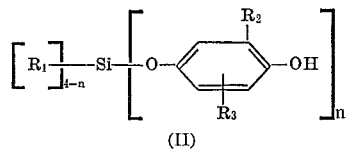
(II)

wherein $R_1$, $R_2$, $R_3$ and $n$ are the same as previously defined for Formula I. Some examples of these preferred compounds are:

diphenyl di(3-tert-butyl-4-hydroxy-5-methylphenoxy) silane,
diphenyl bis(3,5-dicyclohexyl-4-hydroxyphenoxy)silane,
n-decyl-tris[3-cyclohexyl-4-hydroxy-5-(α,α-dimethylbenzyl)phenoxy]silane,
benzyl tris[3,5-di(α-methylbenzyl)-4-hydroxyphenoxy] silane,
dieicosyl di[3-tert-butyl-4-hydroxy-5-(α-methylbenzyl) phenoxy]silane,
α-naphthyl tris(3,5-di-tert-butyl-4-hydroxyphenoxy)silane,
tris(2,4-di-tert-butylphenyl)-[3-methyl-4-hydroxy-5-(α-methylbenzyl)phenoxy]silane,
tetra(3-methyl-4-hydroxy-5-tert-butylphenoxy)silane,
di(4-phenyl-phenyl)-bis-(3,5-di-sec-butyl-4-hydroxyphenoxy)silane,
2,4,6-tri-tert-butyl-cyclohexyl-tris(3,5-di-isopropyl-4-hydroxyphenoxy)silane,
tri-4-methylphenyl-(3,5-diphenyl-4-hydroxyphenoxy) silane, and
di-(4-phenylbenzyl)-di-[3-methyl-5-(α,α-dimethyl-4-tert-butylbenzyl)-4-hydroxyphenoxy]silane.

In a most preferred embodiment of this invention $R_3$ in Formula II is bonded to the carbon atom ortho to the phenolic hydroxyl group. These most preferred compounds have the formula:

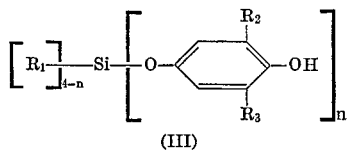

(III)

wherein $n$, $R_1$ and $R_2$ are the same as previously defined for Formula I and $R_3$ is selected from the group previously defined excepting hydrogen. Some examples of these most highly preferred compounds are:

diphenyl bis(3,5-di-isopropyl-4-hydroxyphenoxy)silane,
diphenyl bis(3,5-di-tert-butyl-4-hydroxyphenoxy)silane,
diphenyl bis[3,5-di(α-methylbenzyl)-4-hydroxyphenoxy] silane,
diphenyl bis(3,5-di-cyclohexyl-4-hydroxyphenoxy) silane,
dimethyl di(3-methyl-4-hydroxy-5-tert-butylphenoxy) silane,
dibenzyl di[3-cyclohexyl-4-hydroxy-5-(α,α-dimethylbenzyl)phenoxy]silane, and
triphenyl(3,5-di-sec-butyl-4-hydroxyphenoxy)silane.

A most preferred compound is diphenyl bis(3,5-di-tert-butyl-4-hydroxyphenoxy)silane.

The antioxidant compounds are prepared by reacting the proper halosilane with an ortho-substituted phenolic compound. The following equation serves to illustrate the reaction.

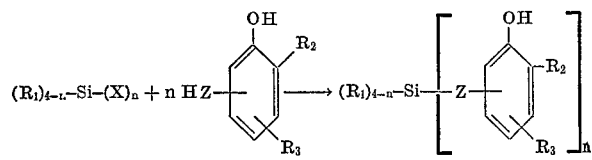

Thus, a further embodiment of this invention is a process for preparing a hydroxyphenyl substituted silicon compound comprising reacting a compound having the formula:

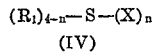

(IV)

wherein $n$ and $R_1$ are the same as previously defined for Formula I and X is a halogen, with a compound having the formula,

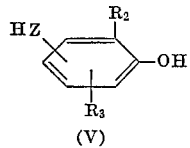

(V)

wherein $R_2$, $R_3$ and Z are the same as previously defined for Formula I. In this process, the preferred halogens represented by X are chlorine and bromine. Thus, some examples of preferred silicon-containing reactants having Formula IV are phenyl trichloro silane, diphenyl dibromo silane, diphenyl dichloro silane, triphenyl chloro silane, dimethyl dichloro silane, trimethyl bromo silane, tetrachloro silane, tetrabromo silane, trichloro benzyl silane, dicyclohexyl dibromo silane, 2,4-di-tert-butylphenyl trichloro silane, eicosyl tribromo silane, α-naphthyl trichloro silane, and the like.

Some suitable reactants having Formula V are 2,6-di-tert-butyl-4-aminophenol,
2-tert-butyl-4-methyl-6-aminophenol,
2-(α,α-dimethylbenzyl)-4-amino-5-methylphenol,
2-cyclohexyl-4-amino-6-tert-butylphenol,
2-phenyl-4-amino-6-tert-butylphenol,
2,6-di-(α-methylbenzyl)-4-aminophenol,
2-(3,5-di-tert-butylphenol)-5-aminophenol,
2-tert-octyl-4-amino-5-methylphenol,
2-tert-eicosyl-4-amino-6-tert-butylphenol,
2,6-di-tert-butyl-p-hydroquinone,
2-tert-butyl-4-methyl-o-hydroquinone,
2-(α,α-dimethylbenzyl)-5-methyl-p-hydroquinone,
2-cyclohexyl-6-tert-butyl-p-hydroquinone,
2-phenyl-6-tert-butyl-p-hydroquinone,
2,6-di(α-methylbenzyl)-p-hydroquinone,
2-(3,5-di-tert-butylphenyl)-5-hydroxyphenol,
2-tert-octyl-6-methyl-p-hydroquinone,
2-tert-eicosyl-6-tert-butyl-p-hydroquinone,
2,6-di-tert-butyl-4-mercaptophenol,
2-tert-butyl-4-methyl-6-mercaptophenol,
2-(α,α-dimethylbenzyl)-4-mercaptophenol,
2-cyclohexyl-4-mercapto-6-tert-butylphenol,
2,6-di(α-methylbenzyl)-4-mercaptophenol,
2-tert-butyl-5-mercaptophenol, and the like.

The reaction proceeds by eliminating a halogen acid from the hydrogen bonded to Z and the halogen bonded to silicon. A feature of this process is that the alpha-branched substituent, $R_2$, ortho to the phenolic hydroxyl group lowers its reactivity and permits the formation of substantially pure product. This is in contrast with what is normally obtained in a reaction of this type where the reactants are poly-functional; that is, they can both have more than one reactive site. In such circumstances, the expected result is polymer formation.

The clean-cut nature of the present process is especially evident when Formula V represents a para-hydroquinone; that is, Z in Formula V is oxygen and is bonded to the position para with respect to the hydroxyl group already present. Highly preferred Formula V reactants are para-hydroquinones in which both positions ortho to one of the hydroxyl groups are substituted and at least one of the substituents is an alpha-branched radical. Thus, a highly preferred embodiment of the process for preparing hydroxyphenoxy silanes is the reaction of a silicon compound having Formula IV wherein $R_1$ and $n$ are as previously defined and X is chlorine or bromine with a para-hydroquinone having the formula:

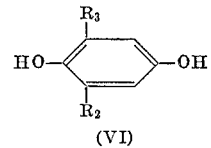

(VI)

wherein $R_2$ is the same as previously defined for Formula I and $R_3$ is selected from the same group previously defined excepting hydrogen.

The ratio of the reactants employed in the process depends on the number of halogen atoms in the silicon compound. It is generally preferred to use from 0.8 to 2 moles of the Formula V reactant per each halogen atom in the Formula IV silicon reactant. For example, in the process employing the reactants, diphenyl dichloro silane and 2,6-di-tert-butyl-p-hydroquinone, from 1.6 to 4 moles of the hydroquinone are used per each mole of the silane because the silane contains two halogen atoms per molecule. A more preferred range is from 0.9 to 1.8 moles of the Formula V reactant per halogen atom in the Formula IV silane, and a most preferred ratio is from 1 to 1.5 moles of Formula V reactant per halogen atom in the silane.

The reaction can be carried out at any temperature high enough to provide a reasonable reaction rate, but not so high as to decompose the reactants and products. A useful temperature range is from about 0 to 300° C. A more preferred temperature range is from about 10 to 150° C., and a most preferred range is from about 30 to 100° C.

The reaction is conveniently carried out in a solvent, although a solvent is not essential. Useful solvents are those that are substantially inert to the reactants and are capable of dissolving some of the material. Preferred solvents are hydrocarbon such as octanes, hexanes, kerosene, mineral spirits, and the like. More preferred solvents are the aromatic hydrocarbons such as benzene, toluene, xylene, and the like.

Although the reaction will proceed without a catalyst, it is usually preferred to include a hydrogen halide acceptor in order to promote the reaction rate. The preferred hydrogen halide acceptors are the tertiary amines such as trimethylamine, triethylamine, tripropylamine, triphenylamine, pyridine, and the like. The most preferred hydrogen halide acceptor is triethylamine. The amount of hydrogen halide acceptor should be about equivalent on a mole basis to the hydrogen halide evolved during the reaction.

The reaction should be conducted for a time sufficient to obtain a satisfactory yield. Good yields are obtained in from about 1 to 8 hours. A preferred reaction time is from about 2 to 6 hours, and a most preferred time is from about 3 to 5 hours.

The products may be recovered by a variety of methods known in the art. The final reaction mass may be merely water washed and the solvent removed by distillation, leaving the product. If a higher purity is required, the product may be recrystallized from a suitable solvent as practiced in the art.

The process does not require an inert atmosphere, but a purer product is obtained when the process is conducted under an inert atmosphere. Hence, it is preferred that the reaction be carried out under an inert atmosphere such as nitrogen.

The following examples will serve to illustrate the process of making the silicon-containing antioxidant compounds of this invention. All parts are parts by weight unless otherwise specified.

EXAMPLE 1

In a reaction vessel equipped with a stirrer, thermometer, heating means and provided with a nitrogen atmosphere was placed 120 parts of toluene, 25 parts of 2,6-di-tert-butyl-p-hydroquinone and 11.4 parts of triethylamine. Following this, 10.5 parts of diphenyl dichloro silane was added and an immediate exothermic reaction occurred. The temperature was maintained at 60–65° C. for 4 hours and then cooled to about 30° C. The reaction mixture was washed 3 times with 150 parts of water in each. The toluene was then distilled off under vacuum and the glass-like residue was recrystallized from isopropyl alcohol, yielding a white crystalline product having a melting point of 171–172° C. Infrared analysis confirmed the structure of the product as diphenylbis(3,5-di-tert-butyl-4-hydroxyphenoxy)silane.

EXAMPLE 2

To the reaction vessel of Example 1 was added 145 parts of toluene, 25 parts of 2,6-di-tert-butyl-p-hydroquinone and 11.4 parts of triethylamine. Following this, 7.5 parts of dimethyl dichloro silane was added. An exothermic reaction occurred. The reaction was maintained at 60–70° C. for a 4 hour period and then cooled to 30° C. and washed 3 times with 150 parts each of water. The toluene was distilled out under vacuum as in Example 1 and the resultant product recrystallized from isopropyl alcohol, leaving a white crystalline product having a melting point of 106–7° C. Infrared analysis confirmed the structure of the product as dimethyl bis(3,5-di-tert-butyl-4-hydroxyphenoxy)silane.

EXAMPLE 3

To a reaction vesel fitted as in Example 1 is added one mole part of 2-tert-butyl - 6 - cyclohexyl-p-hydroquinone, 1000 parts of xylene and one mole part of pyridine. To this is added, over a one hour period at 50° C., 1.2 mole parts of triphenyl chloro silane. The reaction mixture is then heated to 100° C. and stirred at this temperature for an additional 4 hours. The reaction is cooled to 50° C. and washed 3 times with 500 parts each of water. The xylene is then distilled out under vacuum, leaving as a product triphenyl(3-cyclohexyl - 5 - tert-butyl-4-hydroxyphenoxy) silane.

Other phenols can be used in the above example with good results. For example, the use of 2(α,α-dimethylbenzyl)-4-methyl-o-hydroquinone leads to triphenyl[2-hydroxy-3-(α,α-dimethylbenzyl) - 5 - methylphenoxy]silane. Likewise, 2,4-di-tert-butyl-o-hydroquinone yields triphenyl-(2-hydroxy-3,5-di-tert-butylphenoxy)silane. The use of 2-tert - butyl-6-(α,α-dimethylbenzyl)-p-hydroquinone yields triphenyl[3-tert-butyl-4-hydroxy-5-(α,α - dimethylbenzyl) phenoxy]-silane. Substitution of 2,6-dicyclohexyl-p-hydroquinone yields triphenyl (3,5-dicyclohexyl - 4 - hydroxyphenoxy)silane. Similarly, the use of 2-cyclohexyl-6-(α,α-dimethylbenzyl) - p - hydroquinone forms triphenyl[3-cyclohexyl-5-(α,α-dimethylbenzyl) - 4 - hydroxyphenoxy]-silane.

In like manner, other halosilanes can be used in the above example in the quantities previously recommended. The use of triphenyl bromo silane yields the same product as Example 3. The use of dicyclohexyl dichloro silane yields dicyclohexyl di(3-tert-butyl-5-cyclohexyl-4-hydroxyphenoxy)silane. Tribenzyl chloro silane forms tribenzyl-(3-tert-butyl-5-cyclohexyl-4-hydroxyphenoxy)silane. Likewise dodecyl trichloro silane forms dodecyl tri(3-tert-butyl-5-cyclohexyl-4-hydroxyphenoxy)silane.

EXAMPLE 4

To a reaction vessel fitted as in Example 1 is added one mole part of 2,6-di-tert-butyl-4-mercaptophenol, 1000 parts of toluene and one mole part of triethylamine. Over a one hour period, 0.5 mole part of diethyl dibromo silane is added. While stirring, the temperature is raised to reflux and held at this temperature for 8 hours. The reaction is then cooled to 50° C. and washed 3 times with 500 parts each of water. The toluene is then distilled out under vacuum, leaving diethyl bis(3,5-di-tert-butyl-4-hydroxythiophenoxy)silane.

Other mercaptophenols can be used following the above procedure with good results. For example, 2(α,α-dimethylbenzyl)-4-mercapto-6-methylphenol forms diethyl di[3-(α,α-dimethylbenzyl) - 4 - hydroxy-5-methylthiophenoxy] silane. The use of 2-tert-butyl-4-(α,α-dimethylbenzyl)-6-mercaptophenol yields diethyl di[2-hydroxy-3-tert-butyl-5-(α,α-dimethylbenzyl)thiophenoxy]silane. The use of 2,6-dicyclohexyl-4-mercaptophenol leads to diethyl bis(3,5-dicyclohexyl-4-hydroxythiophenoxy)silane. Likewise, 2,6-di(α-methylbenzyl)-4-mercaptophenol forms diethyl bis-[3,5-di(α-methylbenzyl)-4-hydroxythiophenoxy]silane.

Likewise, the previously listed halosilanes can be substituted in Example 4. For example, triphenyl chloro silane forms triphenyl (3,5-di-tert-butyl-4-hydroxythiophenoxy) silane. Dicyclohexyl dibromo silane yields dicyclohexyl bis(3,5-di-tert-butyl-4-hydroxythiophenoxy)silane. Didodecyl dichloro silane results in didodecyl bis(3,5-di-tert-butyl-4-hydroxythiophenoxy)silane.

EXAMPLE 5

To the reaction vessel of Example 1 is added one mole part of 2,6-di-tert-butyl-4-aminophenol, 1000 parts of toluene and one mole part of triethylamine. Over a one hour period, 1.1 mole parts of diphenyl dichloro silane is added, while controlling the temperature at 100° C. The reaction is maintained at 100° C. for an additional hour and then cooled, water washed, and the toluene removed as in the previous examples. The resulting product is diphenyl bis-(3,5-di-tert-butyl-4-hydroxyanilino)silane.

Other aminophenols can be employed following the general procedure of the above example. Use of 2-(α,α-dimethylbenzyl)-4-amino-6-methylphenol yields diphenyl di-[3-(α,α-dimethylbenzyl) - 4 - hydroxy-5-methylanilino] silane. Substitution of 2,6-dicyclohexyl-4-aminophenol results in diphenyl bis(3,5-dicyclohexyl-4-hydroxyanilino) silane. In like manner, the use of 2-(α,α-dimethylbenzyl)-4-amino-6-methylphenol yields diphenyl di[3-(α,α-dimethylbenzyl)-4-hydroxy-5-methylanilino]silane.

The compounds of this invention are extremely useful as antioxidants in a wide variety of organic material normally susceptible to deterioration in the presence of oxygen. Thus, liquid hydrocarbon fuels such as gasoline, kerosene and fuel oil are found to possess increased storage stability when blended with a stabilizing quantity of an additive of this invention. Likewise, hydrocarbon fuels containing organometallic additives such as tetraethyllead, tetramethyllead, methyl cyclopentadienyl manganese tricarbonyl, cyclopentadienyl nickel nitrosyl, ferrocene, methylferrocene and iron carbonyl have appreciably increased stability when treated with the additives of this invention. Furthermore, lubricating oils and functional fluids, both those derived from naturally occurring hydrocarbons and those synthetically prepared, have greatly enhanced stability by the practice of this invention. The additives of this invention are extremely useful in stabilizing antiknock fluids against oxidative degradation. For example, the stabilizing additives of this invention find utility in stabilizing a tetraethyllead antiknock fluid which contains ethylenedichloride and ethylenedibromide.

The additives of this invention are effective in stabilizing rubber against degradation caused by oxygen or ozone. As used in the description and claims, the term "rubber" is employed in a generic sense to define a high molecular weight plastic material which possesses high extensibility under load coupled with the property of forcibly retracting to approximately its original size and shape after the load is removed. Some examples are acrylic rubber, butadiene-styrene rubber (SBR), chloroprene, chlorosulfonated polyethylene, fluorocarbon rubbers, isobutylene-isoprene (IIR), isoprene, butadiene, nitrile-butadiene rubber, polyisobutylene rubber, polysulfide rubbers, silicone rubbers, urethanes, India rubber, reclaimed rubber, balata rubber, gutta percha rubber, and the like. Both natural rubber and synthetic rubbers such as neoprene, SBR rubber, EPT rubber, GR-N rubber, chloroprene rubber, polyisoprene rubber, EPR rubber, poly-cis-butadiene, and the like, are greatly stabilized through the practice of this invention.

The compounds of this invention are also useful in protecting petroleum wax against degradation. The additives also find use in the stabilization of fats and oils of animal and vegetable origin which tend to become rancid during long periods of storage because of oxidative deterioration. Typical representatives of these edible fats and oils are linseed oil, cod liver oil, castor oil, soy bean oil, rapeseed oil, coconut oil, olive oil, palm oil, corn oil, sesame oil, peanut oil, babassu oil, butter, lard, beef tallow, and the like.

The compounds of this invention are superior antioxidants for high molecular weight polyolefins such as polyethylene and polypropylene (both high pressure and so-called Ziegler types), polybutene, polybutadiene (both cis and trans), and the like.

One of the features of the present stabilizers is that they do not cause discoloration when used in transparent, white, or light-colored organic materials such as white rubber or plastics such as polyethylene, polypropylene, and the like.

The amount of stabilizer used in the organic compositions of this invention is not critical, as long as a stabilizing quantity is present, and can vary from as little as 0.001 weight percent to about 5 weight percent. Generally, excellent results are obtained when from 0.1 to about 3 weight percent of the stabilizer is included in the organic compositions.

The following examples serve to illustrate the use of the stabilizers of the present invention in stabilizing some representative organic materials normally subject to deterioration in the presence of oxygen or ozone.

EXAMPLE 6

A rubber stock is prepared containing the following components:

| Component: | Parts |
|---|---|
| Pale crepe rubber | 100 |
| Zinc oxide filler | 50 |
| Titanium dioxide | 25 |
| Stearic acid | 2 |
| Ultramarine blue | 0.12 |
| Sulfur | 3.00 |
| Mercaptobenzothiazole | 1.00 |

To the above base formula is added one part by weight of diethyl bis(3,5-di-tert-butyl-2-hydroxyphenoxy)silane, and following this, individual samples are cured for 20, 30, 45 and 60 minutes, respectively, at 274° C. After cure, all of these samples remain white in color and posses excellent tensile strength. Furthermore, they are resistant to degradation caused by either oxygen or ozone on aging.

EXAMPLE 7

A synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is prepared. To this is added 1.5 parts of dicyclohexyl di[3-($\alpha$-methylbenzyl) - 5 - methyl - 2 - hydroxyphenoxy]silane. This composition is then cured for 60 minutes employing 45 p.s.i.g. of steam pressure. The resulting synthetic rubber possesses resistance to oxygen and ozone induced degradation.

EXAMPLE 8

A butadiene acrylonitrile copolymer is prepared from 68 percent 1,3-butadiene and 32 percent acrylonitrile. Two percent, based on the weight of the copolymer, of tribenzyl(2-ethyl-5-tert-butyl-4-hydroxyphenoxy)silane is added as an aqueous emulsion to the latex obtained from emulsion copolymerization of the butadiene and acrylonitrile monomers. The latex is coagulated with aluminum sulfate and the coagulum, after washing, is dried for 20 hours at 70° C. The synthetic copolymer so obtained is resistant to oxidative degradation.

EXAMPLE 9

Three percent of phenyl tri(3-methyl-5-tert-octyl-4-hydroxyphenoxy)silane as an emulsion in sodium oleate is added to a rubber-like copolymer of 1,3-butadiene and styrene containing 25 percent styrene. The resulting synthetic elastomer possesses enhanced stability.

EXAMPLE 10

To a master batch of GR–N synthetic rubber containing 100 parts of GR–N rubber, 5 parts of zinc stearate,, 50 parts of carbon black, 5 parts of road tar, 2 parts of sulfur and 2 parts of mercaptobenzothiazole is added 5 percent, based on weight, of diphenyl di[3-methyl-5-($\alpha,\alpha$-dimethylbenzyl)-4-hydroxythiophenoxy]silane. After curing, a synthetic rubber is obtained of improved oxidative stability.

EXAMPLE 11

To a master batch of polyethylene having an average molecular weight of 1,000,000, a tensile strength of 6,700 p.s.i., a Shore D hardness of 74 and a softening temperature under low load of 150° C. is added 5 percent of diphenyl bis(3,5 - di-tert-butyl-4-hydroxyphenoxy)silane. The resulting polyethylene possesses stability against oxidative degradation and shows no tendency to yellow after extensive aging.

EXAMPLE 12

A linear polyethylene having a high degree of crystallinity (93 percent) and less than one branched chain per 100 carbon atoms, a density of about 0.96 grams per ml. and which has about 1.5 double bonds per 100 carbon atoms, is mixed with 0.005 weight percent of dieicosyl di(2 - hydroxy - 3 - tert - butyl - thiophenoxy)silane. The resulting polyethylene is found to possess stability against oxidative degradation.

EXAMPLE 13

To 100 parts of an ethylenepropylene terpolymer is added 3 parts of diphenyl bis(3,5-di-tert-butyl-4-hydroxyanilino)silane, resulting in an ethylenepropylene terpolymer of enhanced stability.

EXAMPLE 14

To 100 parts of an ethylenepropylene rubber is added 2 parts of di(3,5-di-tert-butyl-cyclohexyl)-di-(2-hydroxy-3-cyclohexyl-5-tert-butyl-anilino)silane, resulting in an EPR rubber stock of improved stability.

EXAMPLE 15

After the polymerization of polypropylene in a hexane solvent employing a Ziegler catalyst, the catalyst is neutralized with water and diphenyl bis(3,5-di-tert-butyl-4-hydroxyphenoxy)silane is added to the mixture in quantities such that, after evaporation of the solvent, a Ziegler polypropylene is obtained containing 2 percent of diphenyl bis(3,5-di-tert-butyl-4-hydroxyphenoxy)silane. This polypropylene is found to possess excellent stability against degradation caused by oxygen or ozone. Furthermore, this polypropylene is found to resist degradation at elevated temperatures, even in the presence of oxygen. During this high temperature aging the Ziegler polypropylene shown no tendency to discolor.

EXAMPLE 16

To 1,000 parts of a gasoline containing 26.6 percent aromatics, 20.8 percent olefins, 52.6 percent saturates and having an API gravity of 62.1 is added 10 parts of α-naphthyl tris[3 - methyl - 5 - (α,α-dimethylbenzyl)-4-hydroxyphenoxy]silane. The resulting gasoline is stable.

EXAMPLE 17

To 10,000 parts of gasoline containing 8.6 percent aromatics, 7.9 percent olefins, 83.5 percent saturates and having an API gravity of 68.5 is added 200 parts of tridodecyl(3-tert-butyl-4-hydroxyphenoxy)silane. The resulting gasoline is stable against oxidative degradation.

EXAMPLE 18

To 10,000 parts of a gasoline containing 20.0 percent aromatics, 41.2 percent olefins, 38.8 percent saturates and containing additionally 1.5 grams of manganese per gallon as methyl cyclopentadienyl manganese tricarbonyl is added 300 parts of diphenyl di(3-tert-butyl-4-hydroxy-5-methylphenoxy)silane. The resulting gasoline containing a manganese antiknock is resistant to oxidative degradation.

EXAMPLE 19

To 10,000 parts of a gasoline containing 20.5 percent aromatics, 32.9 percent olefins and 46.9 percent saturates and containing 2.39 grams per gallon of tetraethyllead and one theory of chlorine as ethylenedichloride and 0.5 theory of bromine as ethylenedibromide is added to 500 parts of diphenyl bis(3,5 - dicyclohexyl - 4 - hydrophenoxy)silane. The resulting gasoline containing a lead antiknock and halogen scavenger is resistant to oxidative degradation.

EXAMPLE 20

To 10,000 parts of gasoline containing 38.1 percent aromatic, 7.3 percent olefins and 54.6 percent saturates and which contains 3.17 grams per gallon of lead as tetramethyllead, one theory of chlorine as ethylenedichloride, 0.5 theory of bromine as ethylenedibromide and 0.2 theory of phosphorus as tri(β-chloroisopropyl) thionophosphate is added 50 parts of n-decyl-tri[3-cyclohexyl - 4-hydroxy-5-(α,α-dimethylbenzyl)phenoxy]silane. The resulting gasoline is resistant to degradation.

EXAMPLE 21

An antiknock fluid composition is prepared by mixing together 61.5 parts of tetraethyllead, 17.9 parts of ethylenedibromide, 18.8 parts of ethylenedichloride and 1.3 parts of diphenyl bis(3,5-di-isopropyl-4-hydroxyphenoxy)silane, resulting in a stable antiknock fluid composition.

EXAMPLE 22

To 1,000 parts of a commercial diesel fuel having a cetane number of 42, is added 5 parts of amyl nitrate and 4 parts of diphenyl bis(3,5-di-tert-butyl-4-hydroxyphenoxy)silane, resulting in a diesel fuel of high resistance to oxidative deterioration which does not form gum or sludge on storage.

EXAMPLE 23

To 1,000 parts of a solvent refined neutral oil (95 viscosity index and 200 SUS at 100° F.) containing 6 percent of a commercial methacrylate type B-1 improver is added 5 percent of diphenyl bis[3,5-di(α-methylbenzyl)-4-hydroxyphenoxy]silane, resulting in a stable lubricating oil.

EXAMPLE 24

To a solvent refined crankcase lubricating oil having a viscosity index of 95 and a SAE viscosity of 10 is added 0.1 percent of diphenyl bis(3,5-dicyclohexyl-4-hydroxyphenoxy)silane. The resulting oil is stable against oxidative degradation.

EXAMPLE 25

To 100,000 parts of a petroleum hydrocarbon lubricating oil having a gravity of 30.3° API at 60° F., viscosity of 178.8 SUS at 100° F., a viscosity index of 154.2, and containing, 1,000 parts of the reaction product of an alkenyl succinic anhydride where the alkenyl group has a molecular weight of 1,200, with tetraethylenepentamine, is added 200 parts of dimethyl di(3-methyl-4-hydroxy-5-tert-butylphenoxy)silane. The resulting lubricating oil possesses excellent dispersancy and is resistant to oxidative degradation.

EXAMPLE 26

To 100,000 parts of a commercially available pentaerythritol ester having a viscosity at 100° F. of 22.4 centistokes and known under the tradename of "Hercoflex 600" is added 400 parts of dibenzyl di[3-cyclohexyl-4-hydroxy-5-(α,α-dimethylbenzyl)phenoxy]silane. The resulting synthetic lubricating oil possesses improved resistance against oxidative deterioration.

EXAMPLE 27

To 100,000 parts of dioctyl sebacate having a viscosity at 210° F. of 36.7 SUS, a viscosity index of 159, and a molecular weight of 427, is added 250 parts of triphenyl-(3,5-di-sec-butyl-4-hydroxyphenoxy)silane, resulting in a synthetic diester lubricating oil having improved resistance to oxidative deterioration.

EXAMPLE 28

To 1,000 parts of a commercial coconut oil is added 5 parts of di(4 - phenylbenzyl) - di-[3-methyl-5-(α,α-dimethyl - 4-tert-butylbenzyl)-4-hydroxyphenoxy]silane, resulting in a vegetable oil with good aging characteristics.

EXAMPLE 29

To 100,000 parts of lard is added 100 parts of didodecyl bis(3,5-di-tert-butyl-4-hydroxyphenoxy)silane, resulting in a lard having resistance to rancidity.

The stabilizing additives of this invention are eminently useful as stabilizers in polyolefins such as polyethylene, polypropylene, and the like. In this use they function as antioxidants, antiozonants and also as thermal stabilizers. They are extremely long lasting and highly resistant to the formation of color, even on exposure to ultraviolet light.

In order to demonstrate their vastly superior stabilization effect, tests were conducted using a commercial polypropylene. These tests are known as "Oven Aging Tests" and are recognized in the plastic industry as an accurate guide to oxidative stability. In these tests, small specimens of polypropylene are prepared containing the test stabilizer. These test specimens are placed in an air circulating oven maintained at 150° C. Five replicates are made of each polypropylene-stabilizer composition and the test criteria is the time and hours until three of the five replicates show signs of deterioration. Deterioration is evidenced by cracking, discoloration or any visual appearance of change in the specimen.

Test specimens are prepared by mixing the test stabilizers with polypropylene powder for 3 minutes in a Waring Blendor. The mixture is then molded into a 6" x 6" sheet with a thickness of either 0.025" or 0.0625". This is accomplished in a molding press at 400° F. under 5,000 p.s.i. pressure. Each sheet is then cut into ½" x 1" test specimens in order to obtain the five replicate samples. These samples are then subjected to the oven aging tests.

In order to compare the stabilizing additives of this invention, tests were carried out employing several commercially accepted stabilizers along with the preferred stabilizer of the present invention. The results obtained are shown in the following table.

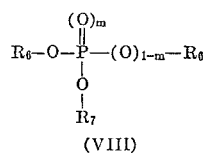

(VIII)

wherein $m$ is an integer from 0-1 and $R_6$, $R_7$ and $R_8$ are independently selected from the group consisting of alkyl radicals containing from 1-20 carbon atoms, aralkyl radicals containing from 7-20 carbon atoms, aryl radicals containing from 6-20 carbon atoms and alkaryl radicals containing from 7-20 carbon atoms. Some examples of synergists are dilaurylthiodipropionate, diamylthiodiacetate, β,β'-thiobis(cetylbutyrate), dieicosylthiodiheptoate, diphenylthiodipropionate, dibenzylthiodibutyrate, didecylthiodipropionate, dihexylthiodiacetate, trinonylphosphite, triphenylphosphite, trimethylphosphite, tri-n-butylphosphite, tributylphosphonate, tri-p-nonylphenylphosphite, tricresylphosphite, trinonylphosphonate, tricetylphosphite, tricyclohexylphosphite, and the like. Preferred synergists are represented by Formula VII wherein $R_4$ contains from 1-3 carbon atoms and $R_5$ is an alkyl radical containing from 10-18 carbon atoms. The most preferred synergists are dilaurylthiodipropionate and distearylthiodipropionate.

| Additive | Concentration, weight percent | Sample thickness, mil | Hours to failure |
|---|---|---|---|
| 1. None | | 25 | 2.5 |
| 2. 2,6-di-tert-butyl-4-methylphenol | 0.3 | 25 | 16 |
| 3. 2,2'-methylenebis(4-methyl-6-tert-butylphenol) | 0.3 | 25 | 112 |
| 4. 4,4'-thiobis(2-tert-butyl-5-methylphenol) | 0.3 | 25 | 96 |
| 5. Diphenyl-bis(3,5-di-tert-butyl-4-hydroxyphenoxy)silane | 0.3 | 25 | 480 |

As the above table shows, the additive of the present invention increased the oven life of the polypropylene almost 20 times that obtained without any additive, and about 5 times as much as the life obtained with two commercially accepted antioxidants. Thus, it can be seen that the additives of the present invention are vastly superior to stabilizers available in the prior art.

The effectiveness of the present stabilizers can be enhanced still further by employing synergistic mixtures of the stabilizers of this invention. The preferred synergists are selected from the group consisting of compounds having the formula:

$$S[R_4-COOR_5]_2$$

(VII)

wherein $R_4$ is a divalent hydrocarbon radical containing from 1-6 carbon atoms and $R_5$ is selected from the group consisting of alkyl radicals containing from 6-20 carbon atoms, aryl radicals containing from 6-20 carbon atoms, aralkyl radicals containing from 7-20 carbon atoms; and compounds having the formula:

The ratio of synergist to stabilizing compound should be adjusted to give the desired protection at the least cost. Mixtures containing from 1 percent synergist and 99 percent stabilizer to those containing 99 percent synergist and 1 percent stabilizer can be employed. A more useful range is from 10-90 percent. Best results are usually obtained with stabilizing mixtures containing from 50 to 66 percent synergist and from 34 to 50 percent stabilizing compound. This results in about 0.1 to 4.5 percent synergist in the formulated organic material.

The synergists can be employed to obtain increased stability using the same concentration of stabilizer or they can be employed to obtain the same stability with less of the stabilizer. Synergists are especially useful in this latter application. Thus, although dilaurylthiodipropionate (DLTDP) is only moderately effective by itself in stabilizing polypropylene, when used with a compound of the present invention a synergist interaction occurs, resulting in a degree of stability totally unexpected from the amount of stabilizers employed. This effect is shown in the following data obtained using the previously described oven aging test.

| Additive | Concentration, weight percent | Sample thickness, mil | Hours to failure |
|---|---|---|---|
| 1. Dilaurylthiodipropionate | 0.3 | 25 | 288 |
| 2. Diphenyl-bis(2,6-di-tert-butylphenoxy)silane | 0.3 | 25 | 480 |
| 3. {Diphenyl-bis(2,6-di-tert-butylphenoxy)silane | 0.1 | | |
| {Dilaurylthiodipropionate | 0.2 | 25 | >528 |

As the above results show, there is a striking synergistic response when an antioxidant compound of this invention is used in combination with a synergist. Dilaurylthiodipropionate itself provides a moderate amount of protection for polypropylene at 0.3 weight percent concentration. However, when used in combination with diphenyl-bis(2,6-di-tert-butylphenoxy)silane, more protection is obtained than is afforded by the same total amount of the antioxidant or synergist used alone. The following table lists some useful synergistic combinations.

| | Percent | |
|---|---|---|
| 1 | 66 | Dilaurylthiodipropionate. |
|   | 34 | Diphenyl-bis(3,5-di-tert-butyl-4-hydroxyphenoxy)silane. |
| 2 | 90 | Dicetylthiodipropionate. |
|   | 10 | Didodecyl-bis(3,5-dicyclohexyl-4-hydroxyphenoxy)silane. |
| 3 | 10 | Diamylthiodiacetate. |
|   | 90 | Dicetyl-di[3-cyclohexyl-4-hydroxy-5-(α,α-dimethylbenzyl)phenoxy]silane. |
| 4 | 50 | Dioctadecylthiodipropionate. |
|   | 50 | Eicosyl-tris(3,5-di-tert-butyl-4-hydroxyphenoxy)silane. |
| 5 | 50 | Trinonylphosphite. |
|   | 50 | Di-p-nonylphenyl-di(2-hydroxy-3-tert-butyl-5-cyclohexylphenoxy)silane. |
| 6 | 10 | Tri-p-nonylphenylphosphite. |
|   | 90 | Triphenyl(3,5-di-tert-butyl-4-hydroxyphenoxy)silane. |
| 7 | 90 | Tributylphosphonate. |
|   | 10 | Triamyl[3-methyl-4-hydroxy-5-(α,α-dimethylbenzyl)thiophenoxy]silane |
| 8 | 75 | Triphenylphosphite. |
|   | 25 | Diphenyl-bis(3,5-di-tert-butyl-4-hydroxyanilino)silane. |
| 9 | 70 | Dilaurylthiodipropionate. |
|   | 30 | Didodecyl[3-cyclohexyl-4-hydroxy-5-(α,α-dimethylbenzyl)anilino]silane. |
| 10 | 30 | Dilaurylthiodipropionate. |
|    | 70 | Dieicosyl-bis(3,5-di-sec-butyl-4-hydroxy-thiophenoxy)silane. |

The above synergistic combinations are useful in any of the previously described organic materials. The organic compositions are prepared as shown in the previous examples by merely adding the synergistic combination in place of the silicon antioxidant compound.

We claim:
1. Organic material normally subject to oxidative degradation containing a stabilizing amount of a compound having the formula:

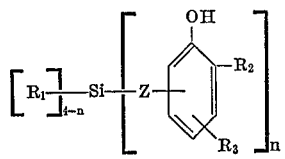

wherein $n$ is an integer from 1–4, $R_1$ is a hydrocarbon radical containing from 1 to about 20 carbon atoms, $Z$ is selected from the group consisting of oxygen, sulfur and the imino radical, $R_2$ is selected from the group consisting of alpha-branched alkyl radicals containing from 3–20 carbon atoms, alpha-branched aralkyl radicals containing from 8–20 carbon atoms, aryl radicals containing from 6–20 carbon atoms, and cycloalkyl radicals containing from 6–20 carbon atoms, and $R_3$ is selected from the group consisting of hydrogen, alkyl radicals containing from 1–20 carbon atoms, aryl radicals containing from 6–20 carbon atoms, aralkyl radicals containing from 7–20 carbon atoms, cycloalkyl radicals containing from 6–20 carbon atoms, halogen and alkoxy radicals containing from 1–12 carbon atoms.

2. The composition of claim 11 wherein said organic material is a polyolefin.
3. The composition of claim 2 wherein said polyolefin is a polypropylene.
4. The composition of claim 3 wherein said compound is diphenyl di(3,5-di-tert-butyl-4-hydroxyphenoxy)silane.
5. The composition of claim 3 wherein said compound is dimethyl di(3,5-di-tert-butyl-4-hydroxyphenoxy)silane.
6. A composition of claim 1 containing a synergistic amount of a synergist selected from the group consisting of compounds having the formula:

(a) $$S\text{-}R_4\text{---}COOR_5]_2$$

wherein $R_4$ is a divalent hydrocarbon radical containing from 1–6 carbon atoms and $R_5$ is selected from the group consisting of alkyl radicals containing from 6–20 carbon atoms, aryl radicals containing from 6–20 carbon atoms and aralkyl radicals containing from 7–20 carbon atoms; and compounds having the formula:

(b) 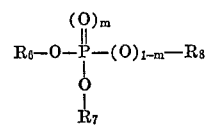

wherein $m$ is an integer from 0–1 and $R_6$, $R_7$ and $R_8$ are independently selected from the group consisting of alkyl radicals containing from 1–20 carbon atoms, aralkyl radicals containing from 7–20 carbon atoms, aryl radicals containing from 6–20 carbon atoms and alkaryl radicals containing from 7–20 carbon atoms.

7. The composition of claim 12 wherein said organic material is a polyolefin.
8. The composition of claim 7 wherein said polyolefin is polypropylene.
9. The composition of claim 8 wherein said compound is diphenyl di(3,5-di-tert-butyl-4-hydroxyphenoxy)silane and wherein said synergist is dilaurylthiodipropionate.
10. The composition of claim 8 wherein said compound is dimethyl di(3,5-di-tert-butyl-4-hydroxyphenoxy)silane and wherein said synergist is dilaurylthiodipropionate.
11. The composition of claim 1 wherein said organic material is selected from the group consisting of ethylenically unsaturated derived hydrocarbon solid synthetic polymers and natural rubber.
12. The composition of claim 6 wherein said organic material is selected from the group consisting of ethylenically unsaturated derived hydrocarbon solid synthetic polymers and natural rubber.

References Cited
UNITED STATES PATENTS 3,352,896   11/1967   Dressler _____ 260—45.95

HOSEA E. TAYLOR, Primary Examiner

V. P. HOKE, Assistant Examiner

U.S. Cl. X.R.

44—75, 76, 78; 99—163; 106—189; 252—51, 54; 260—45.7 P, 45.85, 45.9 R; 45.95, 398.5, 666.5, 810

PO-1050
(5/69)

UNITED STATES PATENT OFFICE
CERTIFICATE OF CORRECTION

Patent No. 3,647,749      Dated March 7, 1972

Inventor(s) Edward F. Zaweski and Bernard R. Meltsner

It is certified that error appears in the above-identified patent and that said Letters Patent are hereby corrected as shown below:

Column 1, in the formula appearing in the Abstract of the Disclosure, that portion of the formula reading $-[R_1]_{4-n}$ should read $[R_1]_{4-n}$ line 31, insert "phosphite or" before "phosphonate". Column 3, in Formula (IV), "S" should read -- Si --. Column 12, in Formula (VIII), "$R_6-O-P-(O)_{1-m}-R_6$" should read -- $R_6-O-P-(O)_{1-m}-R_8$ --.

Signed and sealed this 25th day of July 1972.

(SEAL)
Attest:

EDWARD M. FLETCHER, JR.      ROBERT GOTTSCHALK
Attesting Officer      Commissioner of Patents